(12) United States Patent  
Martin

(10) Patent No.: US 6,606,373 B1  
(45) Date of Patent: Aug. 12, 2003

(54) CONTROLLER FOR USE WITH COMMUNICATIONS SYSTEMS FOR GENERATING A CONDENSED TEXT MESSAGE INDEX

(75) Inventor: Larry J. Martin, Dallas, TX (US)

(73) Assignee: WebLink Wireless, Inc., Dallas, TX (US)

(*) Notice: Subject to any disclaimer, the term of this patent is extended or adjusted under 35 U.S.C. 154(b) by 0 days.

(21) Appl. No.: 09/332,840

(22) Filed: Jun. 14, 1999

Related U.S. Application Data

(63) Continuation-in-part of application No. 09/001,717, filed on Dec. 31, 1997, now Pat. No. 6,198,808.

(51) Int. Cl.[7] .............................................. H04M 1/64
(52) U.S. Cl. ............................... 379/88.01; 379/88.11; 379/88.14; 704/275
(58) Field of Search ........................... 379/88.01, 88.05, 379/88.11, 88.12, 88.13, 88.14, 88.15, 88.16, 88.22; 704/275; 455/412, 413, 414, 466

(56) References Cited

U.S. PATENT DOCUMENTS

| | | | | |
|---|---|---|---|---|
| 4,837,798 A | * | 6/1989 | Cohen et al. | 379/88 |
| 5,717,742 A | * | 2/1998 | Hyde-Thomson | 379/88.17 |
| 5,742,905 A | * | 4/1998 | Pepe et al. | 455/461 |
| 5,764,899 A | * | 6/1998 | Eggleston et al. | 709/203 |
| 5,802,314 A | * | 9/1998 | Tullis et al. | 395/200.76 |
| 5,958,006 A | * | 9/1999 | Eggleston et al. | 709/219 |
| 6,035,017 A | * | 3/2000 | Fenton et al. | 379/88.04 |

(List continued on next page.)

OTHER PUBLICATIONS

"SpeechMania Developer's Kit", Philips Speech Processing, pp. 1–15.
"Speech Processing: Let's Make Things Better," Philips Speech Processing Slide Show.
Web Page—http://www.englishwizard.com/voice.htm, "English Wizard/Voice", Linguistic Technology Corporation, Aug. 1, 1997, pp. 1–2.
Janet M. Baker, "Speech Recognition Design Traps and Tips" pp. 1–11, Dragon Systems, Inc.
Thomas B. Schalk, "Speech Recognition Design Traps: ASR Prime Time Tips", pp.1–7. Voice Control Systems, Inc.
"Conversation Transactions through Speech Recognition", pp. 1–10, Nuance Communications, Inc.
Mike Phillips, "Avoiding Speech Recognition Application Design Pitfalls", pp. 1–8, Applied Language Technologies.
Samuel M. Feldman and Rongrong Wu, "Intelligent Network Speech Recognition", 1997 Annual Review of Communications, pp. 429–435.

Primary Examiner—Scott L. Weaver

(57) ABSTRACT

There is disclosed a non-realtime messaging system that delivers a subscriber message index to a subscriber's pager device. The subscriber message index is a condensed summary of one or more of the messages directed to the subscriber. The messaging system comprises: 1) a messaging controller for receiving oral messages directed to a subscriber and for transmitting text messages to the subscriber's pager; 2) a translating controller for generating translated text messages, wherein each of the translated text messages corresponds to one of the received oral messages; 3) a data repository capable of storing the translated text messages; and 4) a summary index controller for generating from the translated text messages the subscriber message index.

23 Claims, 12 Drawing Sheets

U.S. PATENT DOCUMENTS

| | | | |
|---|---|---|---|
| 6,147,977 A | * 11/2000 | Thro et al. | 370/265 |
| 6,163,765 A | * 12/2000 | Andric et al. | 704/204 |
| 6,185,603 B1 | * 2/2001 | Henderson et al. | 709/206 |
| 6,192,111 B1 | * 2/2001 | Wu | 379/88.13 |
| 6,212,550 B1 | * 4/2001 | Segur | 379/88.14 |
| 6,215,858 B1 | * 4/2001 | Bartholomew et al. | 379/88.17 |
| 6,219,638 B1 | * 4/2001 | Padmanabhan et al. | 379/100.08 |
| 6,222,909 B1 | * 4/2001 | Qua et al. | 379/88.14 |
| 6,263,202 B1 | * 7/2001 | Kato et al. | 455/418 |
| 6,366,651 B1 | * 4/2002 | Griffith et al. | 379/100.13 |
| 6,370,238 B1 | * 4/2002 | Sansone et al. | 379/71 |
| 6,389,114 B1 | * 5/2002 | Dowens et al. | 379/100.09 |
| 6,421,708 B2 | * 7/2002 | Bettis | 709/206 |
| 6,499,021 B1 | * 12/2002 | Abu-Hakima | 706/10 |
| 2002/0067808 A1 | * 6/2002 | Agraharam et al. | 379/88.14 |

* cited by examiner

CONTROLLER FOR USE WITH COMMUNICATIONS SYSTEMS FOR GENERATING A CONDENSED TEXT MESSAGE INDEX

CROSS-REFERENCE TO RELATED APPLICATIONS

The present application is a continuation-in-part of U.S. patent application Ser. No. 09/001,717 for "CONTROLLER FOR USE WITH COMMUNICATIONS SYSTEMS FOR CONVERTING A VOICE MESSAGE TO A TEXT MESSAGE," filed on Dec. 31, 1997 now U.S. Pat. No. 6,852,003. U.S. patent application Ser. No. 09/001,717 is hereby incorporated by reference in the present disclosure as if fully set forth herein.

TECHNICAL FIELD OF THE INVENTION

The present invention is directed, in general, to wireless communication systems and methods of operating the same, and, in particular, to non-realtime communication systems for converting voice messages to text messages, summarizing and indexing the text messages, and transmitting a text message index to a subscriber.

BACKGROUND OF THE INVENTION

The ever-increasing availability and popularity of wireless communication can be linked to technological gains that have provided more efficient, reliable and cost-effective mobile devices, such as message pagers, wireless telephones and personal communication services ("PCS") devices, as examples. Due to their mobility and low power requirements, conventional mobile devices impose significant design constraints upon the wireless communication networks and base stations that support them. Nevertheless, the demand for better and cheaper mobile devices and wireless communication services continues to grow at a rapid pace.

The selection of one mobile device over another is usually the result of a simple cost benefit analysis—the cost of a particular mobile device, the anticipated life span for that device, the usefulness of the various services that can be subscribed to using the device, etc. Message paging subscribers, for instance, demand powerful and sophisticated features (e.g., voice mail, e-mail, wide area paging, out of area roaming, voice messaging, voice response, etc.) that often conflict with the physical restrictions of minimized size and increased battery life. The size of conventional pagers makes it difficult to incorporate advanced features requiring interaction with the subscriber (e.g., integration of control switches/keypads into message pager).

The trend to enhance services has been to incorporate automated call processing techniques into communication systems and system services. Many contemporary message paging systems, for instance, include automated interfaces for interacting with callers. Commonly, these systems enable a caller to the system to leave a message for a subscriber of the system by leaving a call-back number using the telephone keypad.

More advanced systems enable callers to interact with the system by responding to system queries using their telephone keypads. At some point during this interaction, the caller is asked whether he wishes to leave a "text" (alphanumeric) or voice (e.g., voice mail, voice message page, etc.) message. A positive response concerning the "text" message will cause the system to transfer the caller to a system operator to whom the caller dictates a message. After the dictation is complete, the system operator often verifies the text message by reading the same back to the caller. Following the caller's approval, the text message is then transmitted to the subscriber.

Cross-referenced U.S. patent application Ser. No. 09/001, 717 (U.S. Patent Application Ser. No.09/001,717) increases the utility of non-realtime messaging call processing systems by providing the means for recognizing speech from a variety of callers and, in response thereto, for generating substantially equivalent text messages. The processing means uses data patterns representing oral phrases specific to the non-realtime messaging system. The resultant system automates, at least in part, the foregoing dictation process, by translating voice to text for delivery of voice messages to text pagers and by allowing file based automated processing of messages.

However, the present art (including U.S. Patent Application Ser. No.09/001,717) does not address all problems associated with delivery of voice messages to non-realtime text-based communication systems. One such problem is the need for communications between two or more languages. A second problem occurs when a multitude of calls is received for one destination or subscriber, resulting in message-overload for the subscriber.

The latter problem is best illustrated by the fact that some subscribers, such as executives, get inundated with wireless messages. Valuable time is consumed when the subscriber has to review every message in order to find those requiring a priority response. Further, the transmission of multiple messages increases service costs since more system time is required for message transmission. In addition, a higher priced subscriber device (pager) may be required for additional message storage capability, more sophisticated decoding/encoding capability, increased power requirements, etc. Often, these subscriber device enhancements also result in an increase in the physical size and weight of the subscriber device, resulting in a corresponding decrease in user satisfaction.

In order to economically deliver messages to the subscriber's pager, the problems associated with message transfer, storage, and display are frequently addressed by condensing the resultant caller text message into a message summary. However, in some cases, not even message summaries are enough and further improvements are needed to condense the message summaries.

SUMMARY OF THE INVENTION

To address the above-discussed foreign language deficiencies of the prior art, it is a primary object of the present invention to provide, in -a non-realtime messaging system, a means for processing oral messages, including messages in one or more foreign languages, received from a variety of callers and, in response thereto, for generating substantially equivalent text messages, including text messages in one or more foreign languages and the language of the subscriber. Further, it is another primary object of the present invention to provide, in a non-realtime messaging system, a system for processing oral messages received from a variety of callers and for generating substantially equivalent summary text messages and an index listing of the summary text messages.

Accordingly, in one embodiment of the present invention, there is provided a non-realtime messaging system comprising: 1). a messaging controller capable of receiving from callers oral messages directed to a first subscriber of the non-realtime messaging system and capable of transmitting text messages to a communications device associated with the first subscriber; 2) a translating controller, associated with the messaging controller, capable of generating translated text messages, wherein each of the translated text messages corresponds to one of the received oral messages; 3) a data repository capable of storing the translated text messages; and 4) a summary index controller, associated with the messaging controller and the data repository, capable of generating from the translated text messages a subscriber message index, wherein the subscriber message index comprises a reduced summary of one or more of the translated text messages.

According to one embodiment of the present invention, the summary index controller generates the subscriber message index according to criteria selected by the first subscriber.

According to another embodiment of the present invention, the subscriber message index comprises a listing indicating a number of translated text messages received from particular callers.

According to still another embodiment of the present invention, the subscriber message index comprises a listing indicating a level of urgency associated with selected ones of the translated text messages.

According to yet another embodiment of the present invention, the subscriber message index comprises a listing indicating the content of selected ones of the translated text messages.

According to a further embodiment of the present invention, the subscriber message index comprises a listing indicating a number of translated text messages received from at least one organizational group associated with one or more callers.

According to a still further embodiment of the present invention, the messaging controller is capable of receiving from the subscriber a selection message indicating particular ones of the translated text messages that the first subscriber wishes to receive.

According to a still further embodiment of the present invention, the messaging controller, in response to receipt of the selection message transmits to the first subscriber selected ones of the translated text messages.

The foregoing Summary of the Invention outlines, rather broadly, some advantageous features of various embodiments of the present invention so that those of ordinary skill in the art may better understand the Detailed Description that follows. Additional features of the invention will be described hereafter that form the subject matter of the Claims of the Invention. Those of ordinary skill in the art should appreciate that they can readily use the disclosed conception and specific embodiments as a basis for designing or modifying other structures for carrying out the same purposes of the present invention. Those of ordinary skill in the art should also realize that such equivalent constructions do not depart from the spirit and scope of the present invention in its broadest form.

Before undertaking the Detailed Description, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, be a property of, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings wherein like numbers represent like, or analogous, objects and, in which.

DETAILED DESCRIPTION

Figure 1:
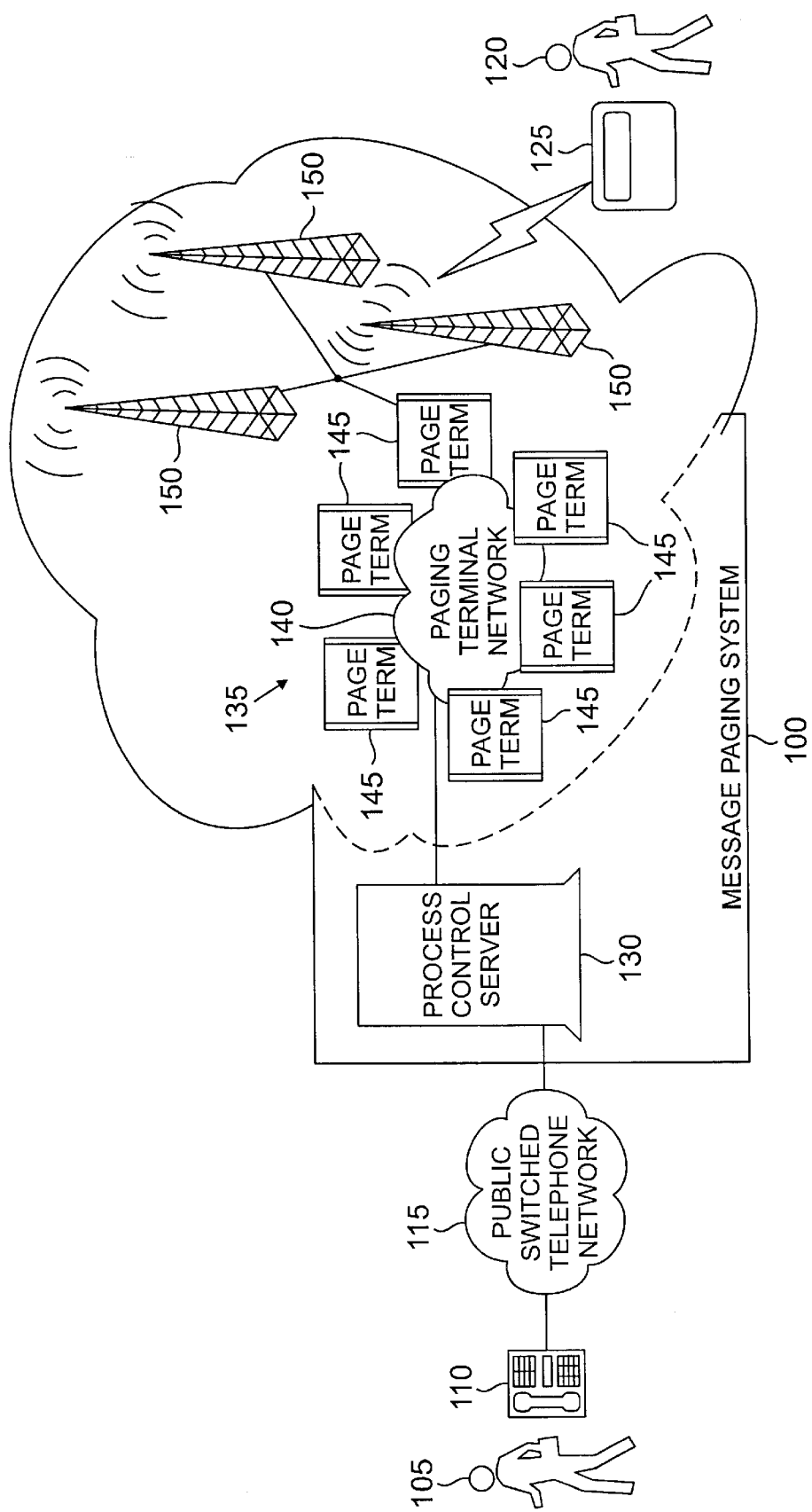
FIG. 1 illustrates a representative portion of an exemplary non-realtime messaging system according to the principles of the present invention.

Turning initially to FIG. 1, illustrated is a representative portion of an exemplary non-realtime messaging system 100, namely, a message paging system, that employs the principles of the present invention.

Message paging system 100 is illustratively associated with a caller 105 via a conventional telephone 110 and a public switched telephone network ("PSTN") 115, and with a subscriber 120 via an exemplary wireless communications device 125, namely, a message pager. Message paging system 100 includes each of a process control server 130 and a messaging network (generally designated 135), namely, a message paging network. Exemplary message paging network 135 includes a paging terminal network 140, a plurality of paging terminals 145 and a plurality of message paging transmitter towers 150. Exemplary paging terminal network 140 is suitably associated with paging terminals 145. One of such paging terminals 145 is illustratively associated with message paging transmitter towers 150. One of such message paging transmitter towers 150 is illustratively in wireless communication with message pager 125.

As is described in detail hereafter, exemplary message paging system 100 is operable to process an oral message received from caller 105 and, in response thereto, to generate a related text message. At least a portion of this text message is transmitted to subscriber 120 via message pager 125.

Figure 2:
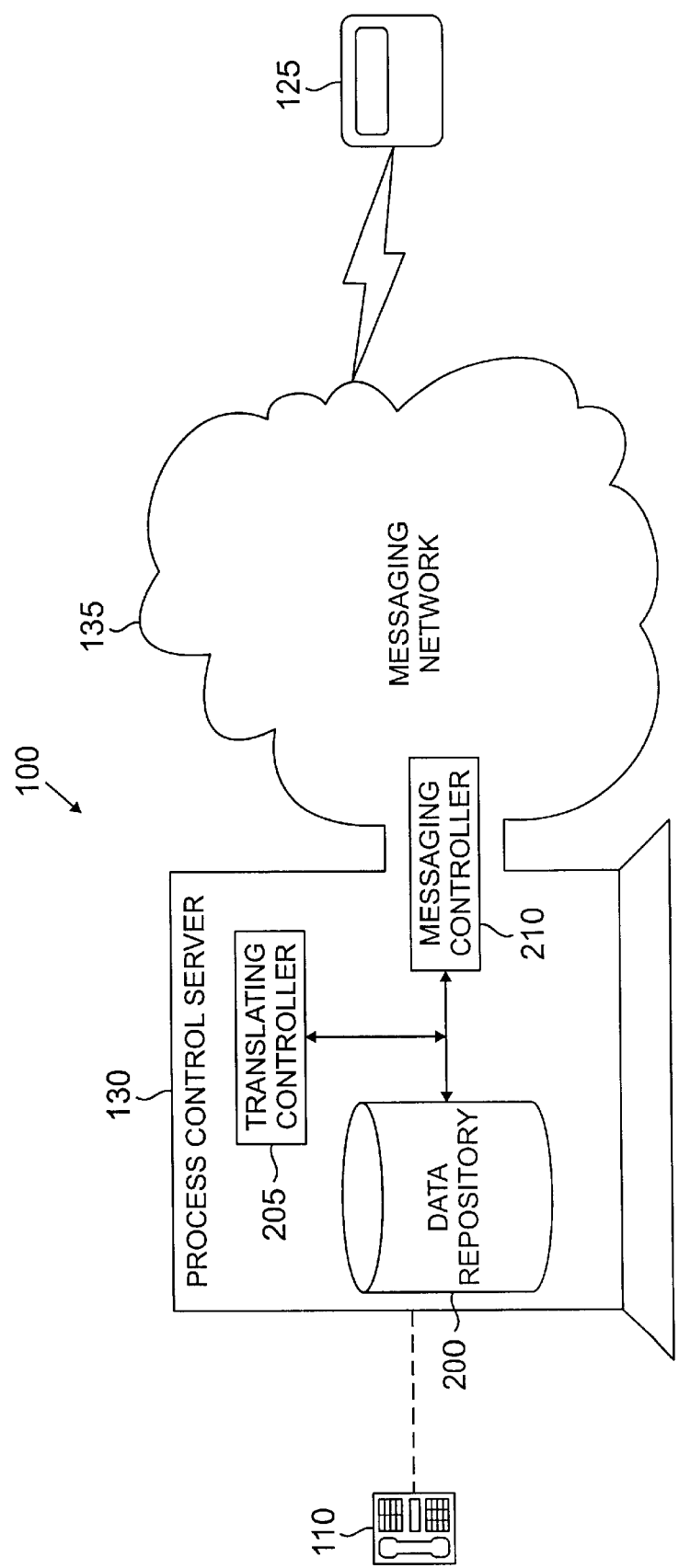
FIG. 2 illustrates a conceptual block diagram illustrating an exemplary association of a process control server and a conventional messaging network introduced with reference to the exemplary non-realtime messaging system of FIG. 1.

Turning next to FIG. 2, illustrated is a conceptual block diagram of message paging system 100 (generally designated) that illustrates an exemplary association of process control server 130 and messaging network 135. Message paging system 100 is again associated with each of telephone 110 and message pager 125. According to this embodiment, process control server 130 includes each of a data repository 200 and a translating controller 205, and process control server 130 and messaging network 135 collectively include a messaging controller 210.

Exemplary messaging controller 210 is capable of receiving oral messages from callers and transmitting text messages to message pagers and other communication devices used by subscribers of message paging system 100. Exemplary data repository 200 is capable of storing data patterns that represent oral phrases specific to message paging system 100. Exemplary translating controller 205, which is associated with data repository 200 and messaging controller 210, is operable to process received oral messages, such as from caller 105, using selected ones of the data patterns stored in data repository 200 and to generate text messages that are at least substantially equivalent to the received oral messages.

The phrase "data repository," as it is used herein, is defined broadly as any collection of data, objects, routines or the like. For instance, data repository 200 may include any number of databases, suitable file structures, or combination of the same. Data repository 200 may be centralized within a single computer or local area network, or distributed across a wide area network. Further, such suitable objects and routines may include executable code, such as code that (i) directs the steps that a computer is to take (as in procedural languages), (ii) sets forth rules that the computer is to follow (as in declarative languages) or (iii) defines objects and their relationships (as in object-oriented programming languages), as examples.

As introduced hereabove, the assignee of the invention disclosed in this patent document provides message paging systems and services. Appendix A of related U.S. patent application Ser. No. 09/001,717, which is incorporated herein by reference for all purposes, includes a list of phrases that were used on a single day by callers into the assignee's message paging system. Such a list would generally be common to any message paging system where a caller spoke with a "live" system operator. This list represents phrases common to the assignee's messaging system. On this day, the system operators transcribed 9,131 different phrases. The numeric value to the right of each phrase indicates the number of times, or frequency, with which the particular phrase was used that day by callers leaving oral messages with system operators. The list is sorted as a function of this value. According to the illustrated embodiment, a portion of this list is used to define a vocabulary specific to message paging system 100. For instance, a limited vocabulary may be defined as the "top 100" phrases used, or any phrase used more than an average of 1000 times a day, or 500 times a day, as examples. There may also be additional or sub-vocabularies, such as subscriber specific, company specific, weather specific, geographic, time specific (e.g., time of day, day of week, season, holiday, etc.). The data patterns, once defined, may remain static or may be dynamic (changing over time).

Exemplary translating controller 205 may include a signal processing module that converts the stored oral message into a series of speech patterns having measurable characteristics. These speech patterns are compared with the data patterns. One advantageous feature that may be implemented in this recognition process may be "key spotting," which makes it possible to pick out "key" phrases from among a sentence of extraneous phrases. Some or all of these "keys" are specific to non-realtime messaging system 100, for instance, a context sensitive grammar defined, at least in part, by APPENDIX A in related U.S. patent application Ser. No. 09/001,717. Another advantageous feature that may be implemented in this recognition process may be adaptive (improves with use) or fully speaker independent, and may include automatic updates, either modifying data patterns that already represent relevant phrases or that add new phrases meeting some criteria (e.g., a phrase is used, on average, more than 500 times a day) In addition, features such as "barge-in" capability, which allow the user to speak at anytime, may be incorporated herein.

Figure 3:
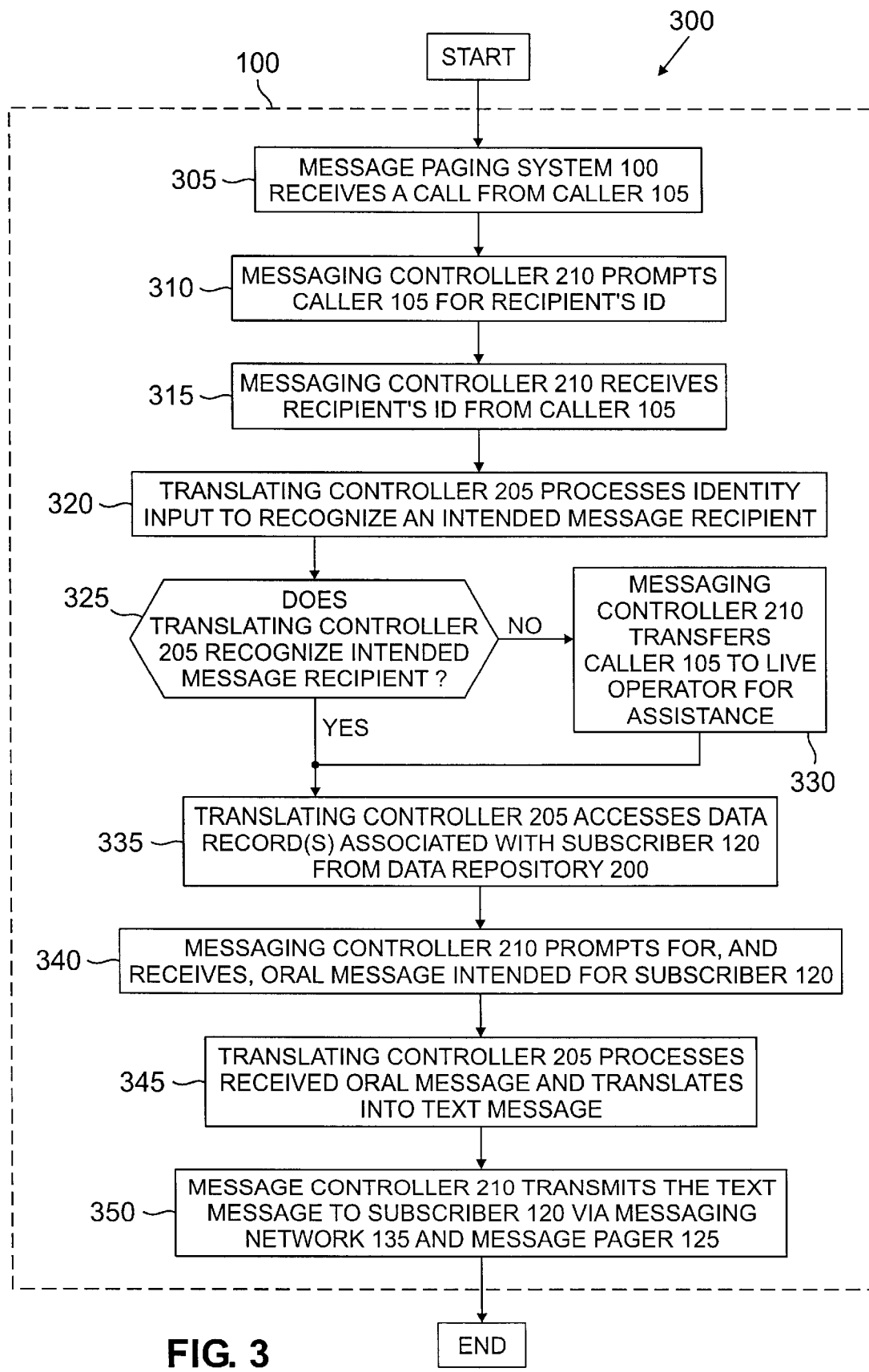
FIG. 3 illustrates a flow diagram of an exemplary method for operating the non-realtime messaging system of FIGS. 1 and 2.

Turning next to FIG. 3, illustrated is a flow diagram of an exemplary method (generally designated 300) for operating message paging system 100. For the purposes of illustration, concurrent reference is made to FIGS. 1 and 2.

To begin, message paging system 100 (particularly, messaging controller 210) receives a call from caller 105 (input step 305). Caller 105, via telephone 110 and PSTN 115, intends to leave a message for subscriber 120. In response, translating controller 205 prompts caller 105, via messaging controller 210, for the identity of an intended message recipient(s), namely, subscriber 120 (output step 310). In response, messaging controller 210 receives an oral, or voice, input from caller 105 that represents the identity of subscriber 120 (input step 315).

Generally speaking, the content of this received input is implementation dependant; for instance, it may represent the name or a personal identification number ("PIN") of the intended message recipient(s). In point of fact, any conventional means may be employed by system 100 for caller 105 to identify subscriber 120, whether such means involves speech recognition, use of a dual tone multi-frequency ("DTME") keypad, or the like. According to one advantageous embodiment, subscriber 120 is assigned a "personal," or unique, telephone number and when caller 105 uses the same to contact system 100, the identity of subscriber 120 is immediately known.

Returning to FIG. 3, translating controller 205 accesses data repository 200 and attempts to recognize the received input by using ones of the stored data patterns representing subscriber identities, names or the like (process step 320). Translating controller 205 compares the received input and the subscriber data patterns; for instance, translating controller 205 may separate, or "break down," the identity input into sub-parts having one or more measurable characteristics and then compare such measurable characteristics and the "Subscriber" data patterns (such recognition techniques are known).

If translating controller 205 fails to identify subscriber 120 (NO branch of decisional step 325), then translating controller 205, via messaging controller 210, transfers caller 105 to a "live" operator (not shown) for assistance (process step 330). After caller 105 identifies subscriber 120 to the operator, control is transferred back to translating controller 205.

Figure 4:
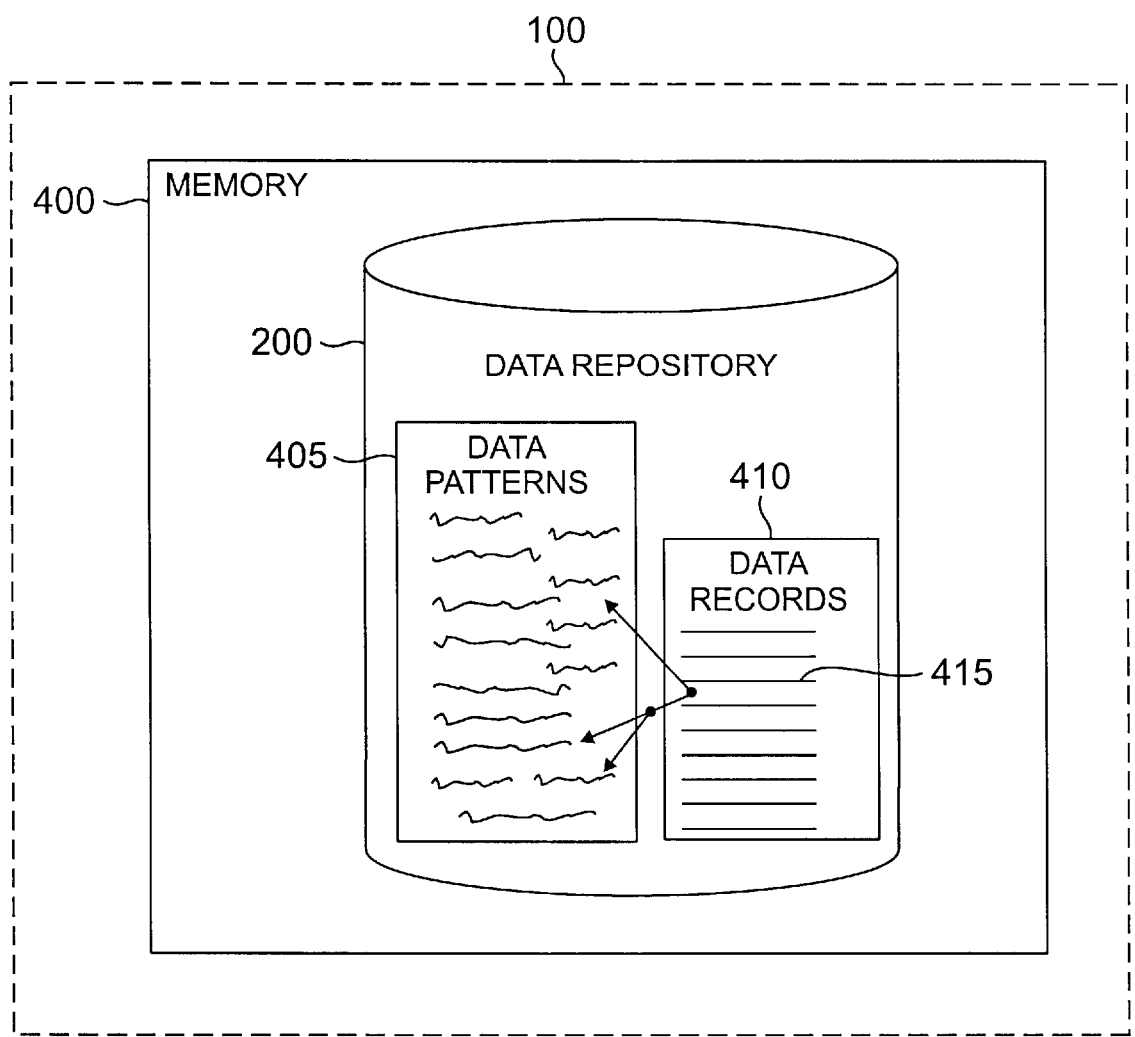
FIG. 4 illustrates a conceptual configuration of a conventional memory that includes a data repository introduced with reference to FIG. 2.

Translating controller 205 accesses, or "looks up," one or more data records in data repository 200 that are associated with subscriber 120 (process step 335; discussed hereafter with reference to FIG. 4). The exemplary data record(s) provides particulars for delivering messages to associated recipients, presently, subscriber 120. For instance, assume subscriber 120 wants all received oral messages to be stored in voice mail and translated into text messages, that such text messages be sent to an e-mailbox, and that summaries of such text messages be sent to message pager 125.

Translating controller 205, via messaging controller 210, prompts caller 105 for, and receives, an oral message input representing the body of a message for subscriber 120 (input/output step 340). Translating controller 205 processes the oral message and translates the same into a proposed text message (process step 345; discussed further with reference to FIG. 5).

According to the present embodiment, translating controller 205 accesses data repository 200 to store the received message input therein and to access the stored data patterns. Controller 205 separates the message input into sub-parts, at least some of which have one or more measurable characteristics (e.g., phonemes). Translating controller 205 compares such measurable characteristics and the stored data patterns, and generates at least a substantially equivalent text message in response thereto. The generated text message is a concatenation of data patterns that represent those sub-parts, or groups of sub-parts, separately, or collectively, that compare most favorably. In alternate embodiments, any conventional speech recognition system, or engine, that can suitably use a vocabulary specific to message paging system 100, such as a vocabulary defined using APPENDIX A, may be used.

Messaging controller 210 transmits, via messaging network 135, at least part of the generated text message to subscriber 120 having message pager 125 (output step 350). According to the present embodiment, translating controller 205, in response to the one or more data record(s) associated with subscriber 120, controls messaging controller 210.

Turning next to FIG. 4, illustrated is a conceptual configuration of a conventional memory 400 that includes data repository 200. Data repository 200 includes a plurality of data patterns 405 (i.e., speech models constructed using knowledge of acoustics, language, dictionaries, grammars or the like) and a plurality of subscriber records 410.

According to this embodiment, a particular subscriber record 415 is associated with subscriber 120 and, among its other attributes, includes pointers to particular ones of the plurality of data patterns 405. These particular data patterns are a "subset" of data patterns that represent oral phrases common to subscriber 120. Thus, while data patterns 405 are collectively specific to a general type of non-realtime messaging system, namely, message paging system 100, this subset of data patterns is particularly related to subscriber 120.

Referring back to the above-given example, assume again that a freight delivery company subscribes to a suitably arranged message paging system and each of its drivers carries a conventional alphanumeric message pager. Assume further that one of its drivers is subscriber 120 and that subscriber 120 works directly for "Joe," is married to "Jane," delivers a lot of "widgets," and his primary delivery stops are at "ABC Company," "XYZ Inc.," and "OPQ Limited." Data record 415 may suitably define a data pattern subset of {joe jane widgets abc co. company xyz inc. incorporated opq ltd. limited}. Data patterns 405, used in combination with a suitable subset thereof, may cooperatively provide a context sensitive vocabulary that can increase the likelihood that translating controller 205 will successfully translate (recognize, at least in part) a received oral message, but can also decrease the time required to translate the same.

As discussed above with reference to APPENDIX A in related U.S. patent application Ser. No. 09/001,717, data patterns 405 may be static or dynamic. Similarly, the subset of data patterns may also be static or dynamic. The subset may be defined once, periodically, etc., or it may be defined and redefined in response to the frequency with which various ones of data patterns 405 are used. For instance, system 100 may determine that subscriber 120 is regularly stopping at "DEF Co." and modify the above-identified subset associated with subscriber 120 accordingly. Alternatively, assume subscriber 120 is injured and placed on disability leave. Assume further that the regular stops assigned to subscriber 120 are reassigned to another driver. Under this scenario, system 100 may associate the data pattern subset associated with subscriber 120 with that of this second driver.

Figure 5:
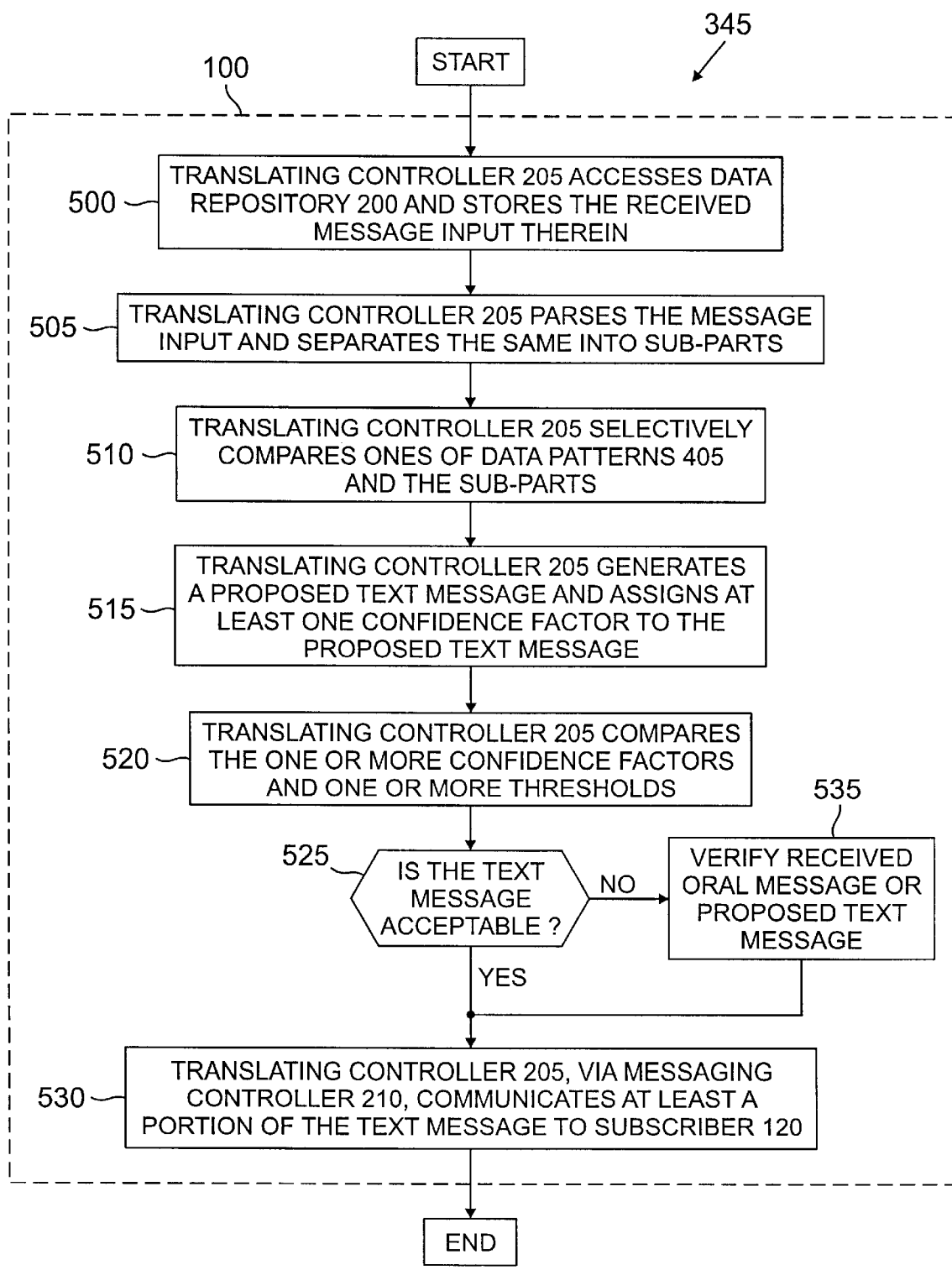
FIG. 5 illustrates a flow diagram of an exemplary method for processing received oral messages and translating the same into at least substantially equivalent text messages in accordance with the principles of the present invention.

Turning next to FIG. 5, illustrated is a flow diagram of an exemplary method (generally designated 345) for processing received oral messages and translating the same into at least substantially equivalent text messages in accordance with the principles of the present invention. For purposes of illustration, concurrent reference is made to FIGS. 1 through 4. Although the present discussion is directed largely to process step 345 of FIG. 3, the principles hereof may suitably be adapted for process step 320 as well.

Translating controller 205 accesses data repository 200 (particularly, data patterns 405 stored therein) and stores the received message input therein (process step 500). Translating controller 205 may store the message input directly or indirectly by controlling messaging controller 210. Translating controller 205 parses the message input, separating the same into sub-parts (process step 505). At least some of these sub-parts have one or more measurable characteristics associated therewith.

Translating controller 205 attempts to recognize the message input by selectively comparing data patterns 405 and the sub-parts (process step 510). More particularly, according to the present embodiment, particular data patterns are emphasized during the comparison process in response to the content of data record 415. The emphasized data patterns and the measurable characteristics are suitably compared.

As introduced hereabove, SIVR (speaker independent voice recognition) technologies attempt to convert speech into accurate/meaningful textual information. An important aspect of the present embodiment is that the limited vocabulary defined by data patterns 405 (specific to message paging system 100) and the select (emphasized) data patterns 405 identified by data record 415 (specific to subscriber 120) reduces the processing demands inherent to contemporary SIVR products.

Depending upon the implementation, exemplary translating controller 205 employs at least one of the following SIVR techniques in connection with data patterns 405 or the emphasized data patterns, namely:

1. isolated phrase recognition in which translating controller 205 is capable of recognizing a discrete set of phrases;

2. connected word recognition in which translating controller 205 is capable of recognizing a discrete set of phrases (as above), but is also capable of recognizing fluent sequences of these phrases (e.g., successive digits in a particular subscriber's PIN); or 3. continuous speech recognition in which a system is trained on a discrete set of sub-word vocabulary units (e.g., phonemes), but is required to recognize fluent speech.

Returning to FIG. 5, translating controller 205, in response to selectively comparing data patterns 405 and the measurable characteristics, generates a proposed text message and assigns a confidence factor either to a proposed text message as a whole or to one or more of the sub-parts thereof (process step 515). The generated text message is a concatenation of data patterns 405 representing those sub-parts or group(s) of sub-parts that, separately or collectively, compare most favorably with the same.

Translating controller 205 compares the one or more confidence factors and at least one threshold (process step 520). The term "threshold," as it is used herein, is defined broadly as any indicator that renders the recognition accuracy of a sub-part, group of sub-parts, multiple groups of sub-parts, or the proposed text message as a whole, one of acceptable or unacceptable, such as a "ceiling" or "floor" value, as examples.

In response thereto, translating controller 205 determines whether a particular sub-part, group of sub-parts, multiple groups of sub-parts, or the proposed text message as a whole, is suitably acceptable (decisional step 525). If the proposed text message is acceptable (YES branch of decisional step 525), then the text message, or an appropriate portion thereof, is communicated to subscriber 120 (process step 530). If the proposed text message is unacceptable (NO branch of decisional step 525), then translating controller 205 enters a message verification sub-controller (process step 535, discussed with reference to FIG. 6).

According to the illustrated embodiment, acceptance of the proposed text message may be determined, in part, in response to the content of the data record associated with the intended message recipient(s). To continue with the above-given example, assume that data record 415 associated with subscriber 120 (i) defines a data pattern subset of [joe jane widgets abc co. company xyz inc. incorporated opq ltd. limited] and (ii) directs system 100 to send (a) translated text messages to subscriber 120's e-mailbox (not shown), (b) summaries of such text messages to message pager 125, and (c) store the oral message input in subscriber 120's voice-mailbox (not shown). Assume further, that the received oral message was "MCALL JANE AT MIMI'S OFFICE AT 2145559999" and that the prosed translated text message was "CALL JANE AT ME MEEZ OFFICE AT (214) 555-9999". Assume lastly, that translating controller 205 assigned the following confidence factors:

TABLE

| Proposed Phrase | Confidence Factor | Threshold |
|---|---|---|
| CALL | .98 | .81 |
| JANE | .96 | .86 |
| AT | .98 | .82 |
| ME | .94 | .83 |
| MEEZ | .43 | .92 |
| OFFICE | .85 | .89 |
| AT | .97 | .82 |
| (214) 555–9999 | .99 | .80 |
| CALL JANE | .96 | .85 |
| AT ME MEEZ OFFICE | .54 | .92 |
| AT (214) 555–9999 | .99 | .81 |
| CALL JANE AT ME MEEZ OFFICE | | |
| AT (214) 555–9999 | .63 | .92 |
| CALL JANE AT (214) 555–9999 | .98 | .89 |

Translating controller 205, in response to the foregoing values and data record 415, generally accepts the translated text message. Translating controller 205, via messaging controller 210, communicates the following translated text message to subscriber 120's e-mailbox, namely, "CALL JANE AT ME MEEZ OFFICE AT (214) 555-9999", communicates a text message summary of "CALL JANE AT (214) 555-9999" to message pager 125, and communicates the oral message input to subscriber 120's voice-mailbox.

Figure 6A:
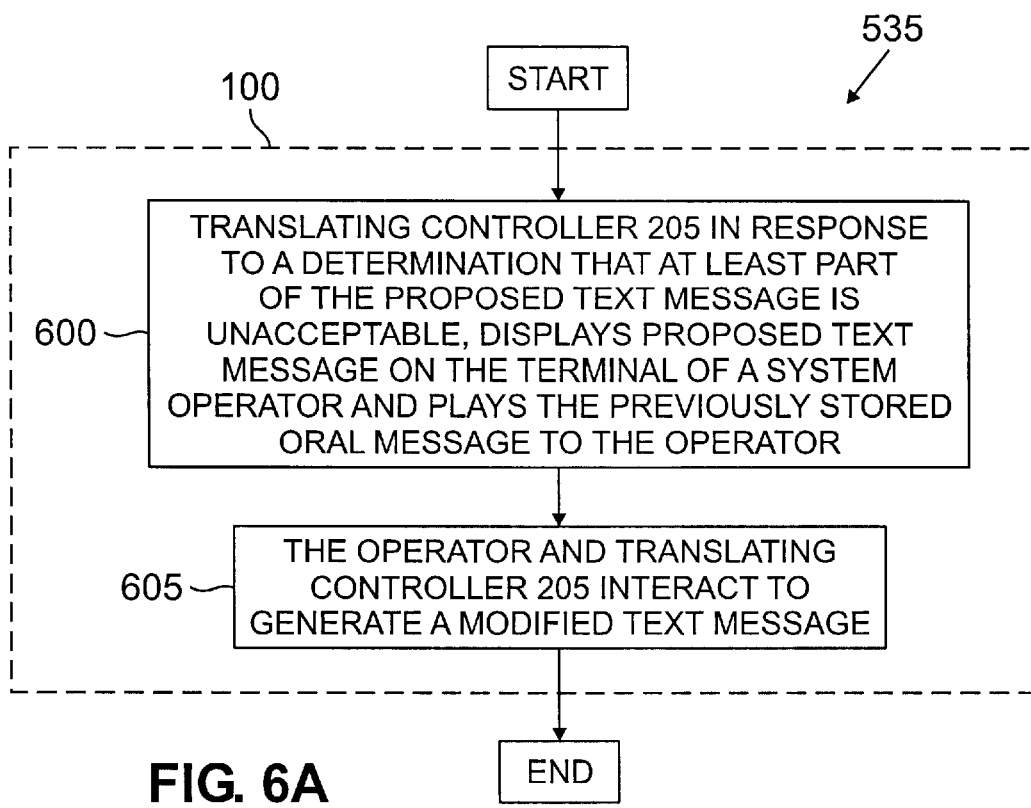
FIGS. 6A to 6C illustrate flow diagrams of exemplary methods for verifying a proposed text message in accordance with the principles of the present invention.
Figure 6B:
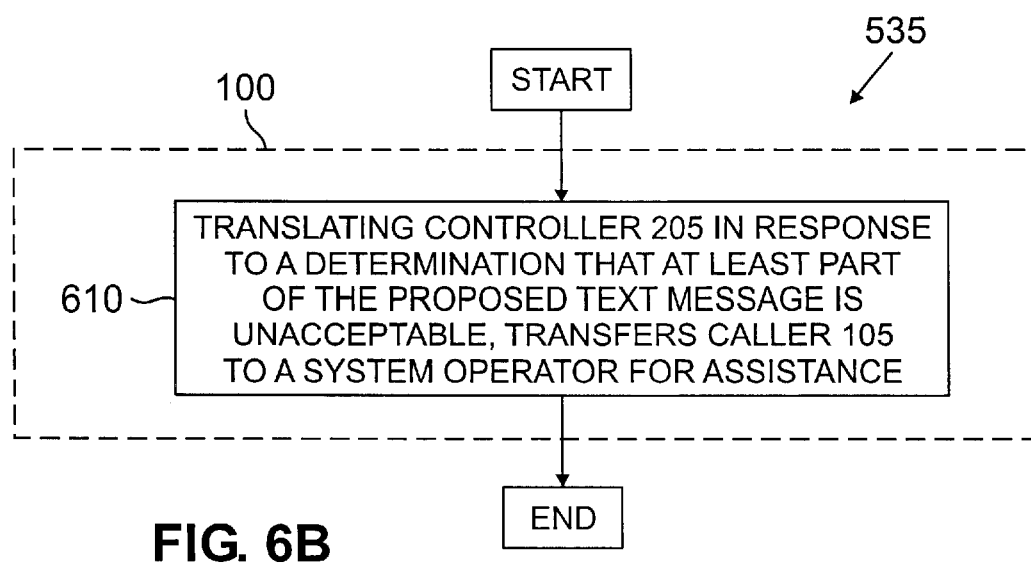
Figure 6C:
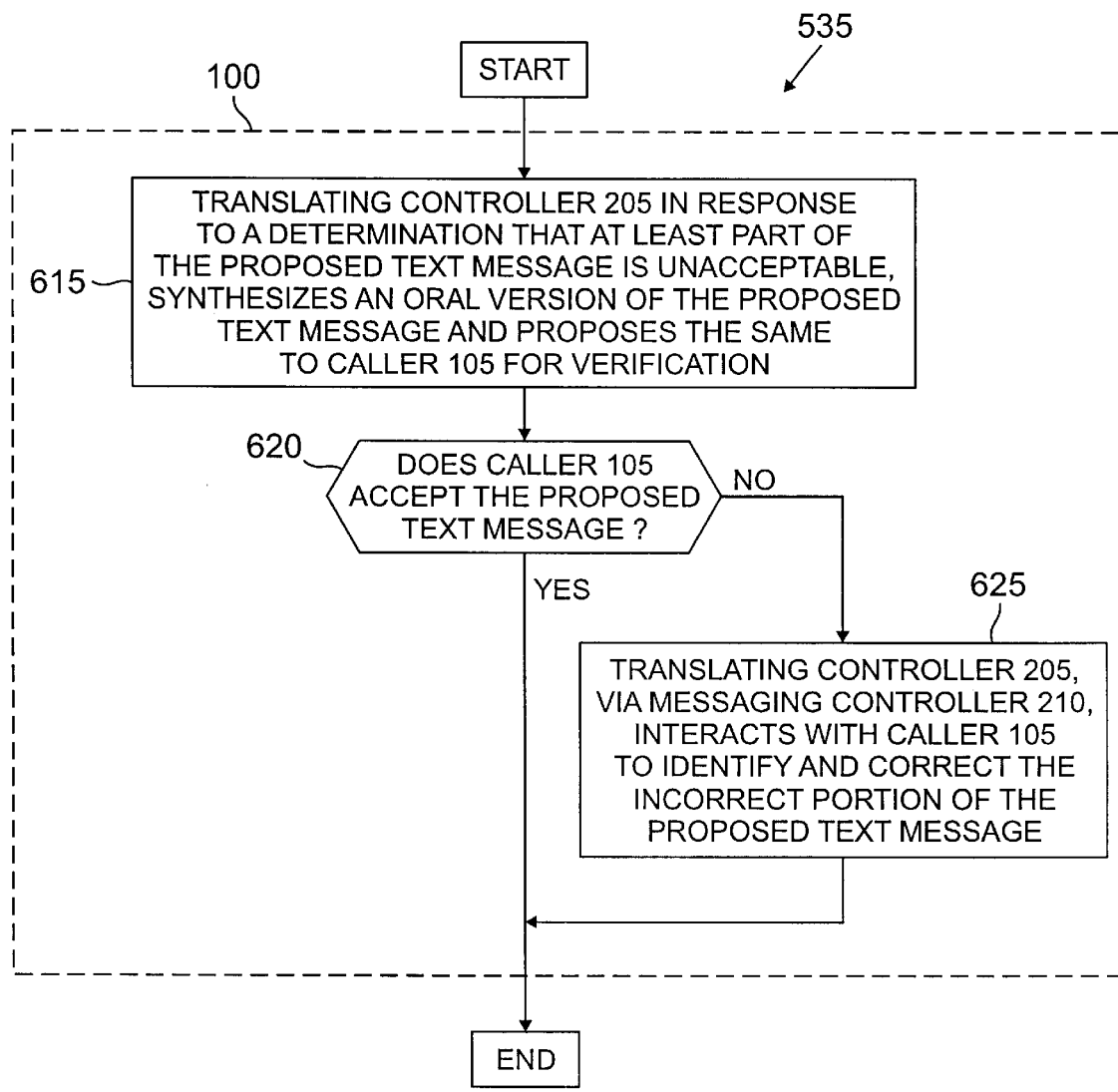

Turning next to FIGS. 6A to 6C, illustrated are flow diagrams of exemplary methods (generally designated 535) for verifying a proposed text message in accordance with the principles of the present invention. For purposes of illustration, concurrent reference is made to FIGS. 1 through 5. Although the present discussion is directed largely to process step 535 of FIG. 5, the principles hereof may suitably be adapted for process step 320 of FIG. 3 as well.

Concerning FIG. 6A, translating controller 205, in response to a determination that at least a portion of the proposed text message is unacceptable, displays the proposed text message on the terminal/work station of a system operator (not shown) and plays the previously stored oral message to the operator (process step 600). The operator, via the terminal/work station, interacts with translating controller 205 to generate a modified text message (process step 605).

Concerning FIG. 6B, translating controller 205, in response to a determination that at least a portion of the proposed text message is unacceptable, transfers caller 105 to a system operator for assistance (process step 610). According to an advantageous embodiment, translating controller 205 plays the previously stored oral message for the operator and displays the proposed text message to the operator before, or while, transferring caller 105 thereto, in short, the system front-loads, or pre-fetches, information that the operator may need to efficiently interact with caller 105.

Concerning FIG. 6C, translating controller 205, in response to a determination that at least a portion of the proposed text message is unacceptable, synthesizes an oral version of the generated text message and proposes, or plays, the same to caller 105 (process step 615). This may be accomplished either by maintaining the communication channel with caller 105 during oral message processing or, alternatively, by calling caller 105 back to verify the message. The caller may accept or reject the text message.

In the event that caller 105 accepts the text message (YES branch of decisional step 620), the text message is sent to subscriber 120 (process step 530); if caller 105 rejects the proposed text message (NO branch of decisional step 620), then translation controller 205, via messaging controller 210, interacts with caller 105, enabling caller 105 to identify that portion of the proposed text message that is incorrect and correct the same (process step 625). For instance, caller 105 may parse (e.g., orally, DTMF keypad, etc.) the proposed text message with system 100, identifying the incorrect portion or portions. System 100 then prompts, or asks, caller 105 to spell the phrase, to select or pick a phrase from a group or list of phrases, or the like, thereby correcting the same.

Figure 7:
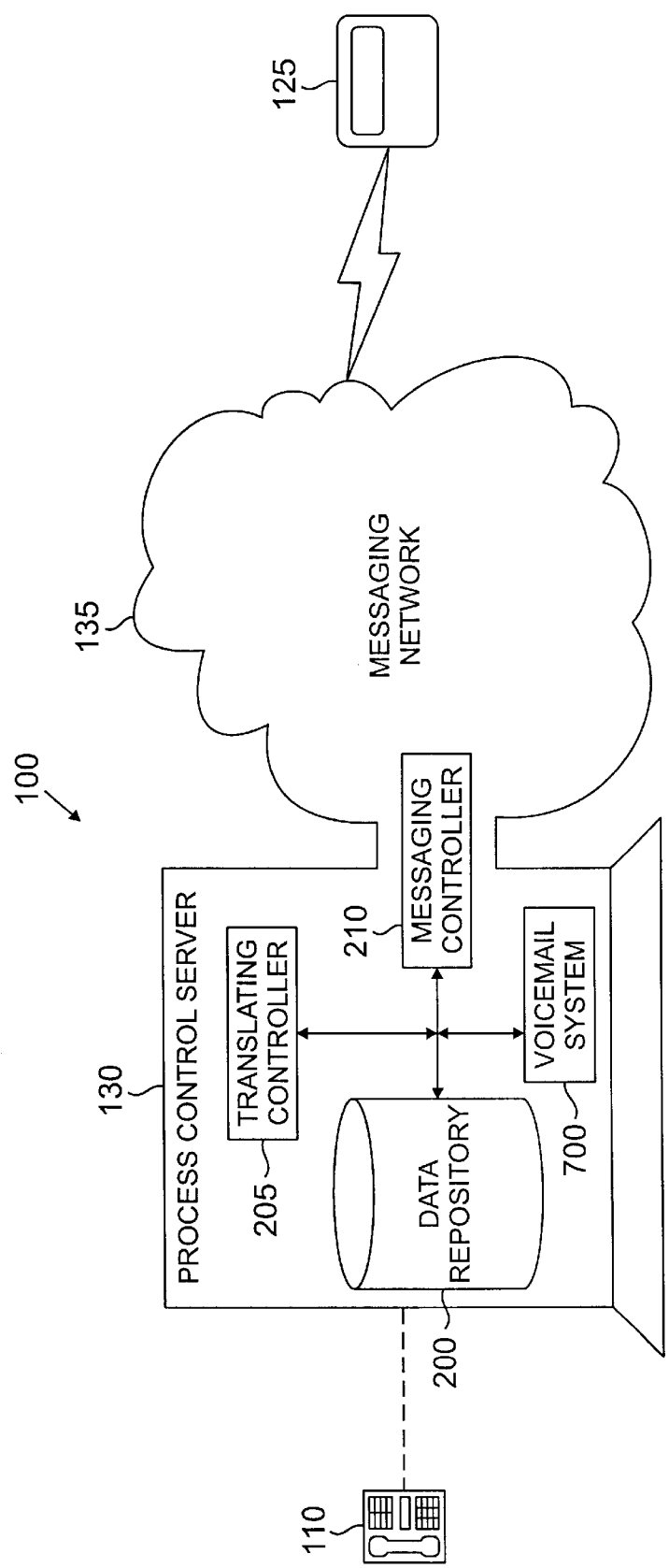
FIG. 7 illustrates a conceptual block diagram of an alternate embodiment of the non-realtime messaging system of FIGS. 1 and 2 having a message paging system that includes a suitably arranged voice mail system according to the principles of the present invention.

Turning next to FIG. 7, illustrated is a conceptual block diagram of an alternate embodiment of exemplary non-realtime messaging system 100 (generally designated) according to the principles of the present invention. Messaging system 100 illustrates a cooperative association between a message paging system and a suitably arranged voice mail system. Messaging system 100 is again associated with telephone 110 and message pager 125, and includes process control server 130 and messaging network 135.

Figure 8:
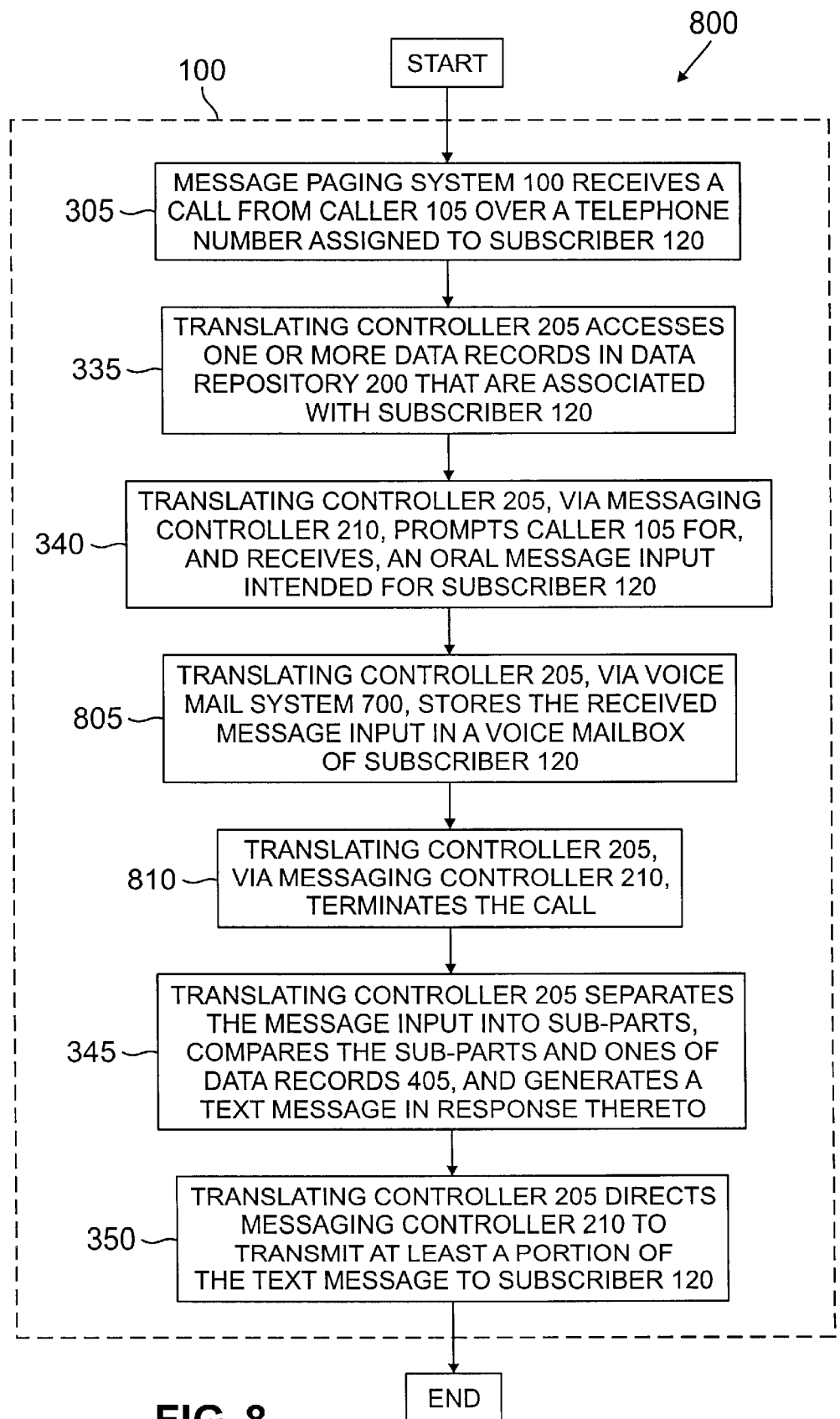
FIG. 8 illustrates a flow diagram of an exemplary method for operating the non-realtime messaging system of FIG. 7.

According to this embodiment, process control server 130 includes data repository 200, translating controller 205 and a voice mail system 700. Again, process control server 130 and messaging network 135 collectively include a messaging controller 210. Exemplary voice mail system 700 is capable of recording, storing and retrieving voice messages, and interacting with translating controller 205 and messaging controller 210. For the purposes of discussion, turn to FIG. 8, illustrated is a flow diagram of an exemplary method (generally designated 800) for operating messaging system 100 of FIG. 7.

To begin, messaging system 100 (particularly, messaging controller 210) receives a call from caller 105 (input step 305). This call is received through a personal telephone number assigned to subscriber 120. Translating controller 205 accesses one or more data records in data repository 200 that are associated with subscriber 120 (process step 335). Again, the data record(s) provide particulars for delivering messages to subscriber 120.

Translating controller 205, via messaging controller 210, prompts caller 105 for, and receives, an oral message input representing a message for subscriber 120 (input/output step 340). Translating controller 205, via voice mail system 700, stores the received message input in a voice mailbox (not shown) assigned to subscriber 120 (process step 805). The voice mailbox may be stored in memory 400. The call is terminated (input/output step 810).

Translating controller 205 (i) separates the stored message input into sub-parts, at least some of which have one or more measurable characteristics; (ii) compares such measurable characteristics and data patterns 405 of data repository 200; and (iii) generates a substantially equivalent text message in response thereto (process step 345). The generated text message is a concatenation of data patterns that represent those sub-parts, or groups of sub-parts, separately, or collectively, that compare most favorably therewith.

An important aspect of this embodiment is that caller 105 is not required to interact with, or even be aware of, translating controller 205. Since the speech recognition process may be accomplished after the oral message is stored or recorded (i.e., the call is terminated), voice messages can be queued and the recognition process performed in non real-time. Because time is less of an issue, as the call is terminated, translating controller 205 may suitably use several specialized vocabularies to translate the oral message into the text message. Such selective use of small specialized vocabularies tends to improve SIVR performance. Vocabularies unique to subscriber 120 and even some callers, such as caller 105, may be defined and used to augment a standard message paging vocabulary.

Messaging controller 210 transmits, via messaging network 135, at least part of the generated text message to subscriber 120 via message pager 125 (output step 350). Again, exemplary translating controller 205, in response to the one or more data record(s) associated with subscriber 120, controls messaging controller 210. It should be noted that the functionality discussed with reference to FIGS. 5 and 6A to 6C may suitably be adapted and associated with the illustrated voice mail/message paging system of FIGS. 7 and 8.

In addition, it should also be noted that use of restricted vocabularies may also be used to extract a "summary" voice message. In point of fact, the functionality discussed with respect to FIG. 5 may be used. For instance, subscriber 120 may subscribe to messaging services associated with messaging system 100 that include an option for "voice mail summary notification." This service may use speech recognition to identify "key phrases," such as, those above-identified or words like "urgent," "important," or "emergency." The summary notification is sent to message pager 125 and includes a list of key phrases identified. Such functionality would assist subscriber 120 when deciding when to call to listen to voice mail messages.

As a further example, certain subscribers of message paging system 100 receive large volumes of voice messages daily. Notifying these subscribers for every voice message may be bothersome. A voice mail notification system that includes a restricted vocabulary that may be used to detect "trigger" phrases, such as "urgent," "emergency," or the like, filter received voice messages, and report the delivery of those messages meeting certain characteristics, namely, those defined by the "trigger-phrase" vocabulary—received oral messages having a higher probability of significance.

Figure 9:
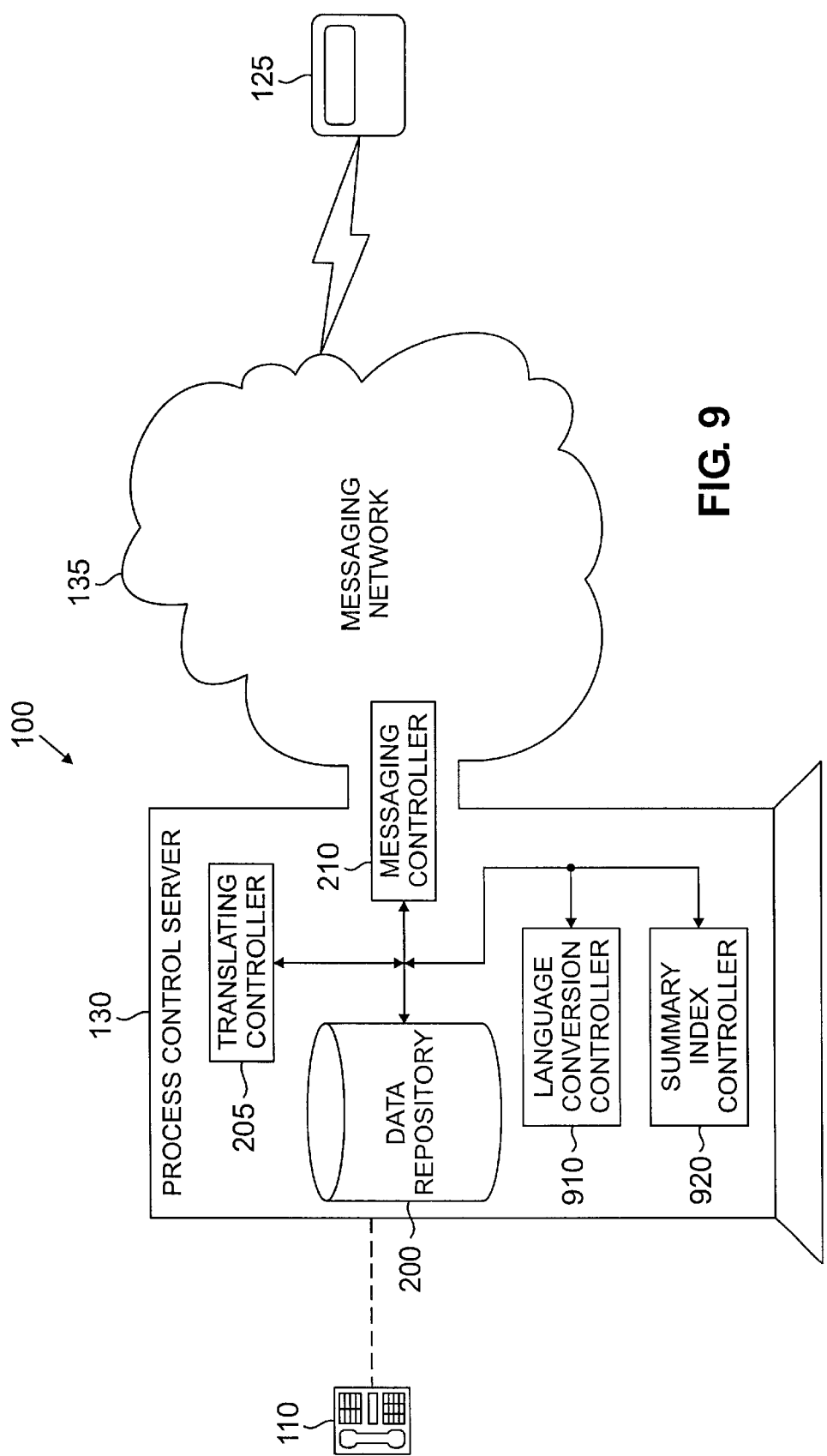
FIG. 9 is a block diagram illustrating an alternate embodiment of exemplary non-realtime messaging system according to the principles of the present invention.

Turning next to FIG. 9, illustrated is a block diagram of an alternate embodiment of exemplary non-realtime messaging system 100 according to the principles of the present invention. Messaging system 100 illustrates a cooperative association between a message paging system, a controller for converting speech in one language into text in another language, and a controller for generating an index of message summaries. Messaging system 100 is again associated with telephone 110 and message pager 125, and includes process control server 130 and messaging network 135.

According to exemplary embodiment, process control server 130 further comprises data repository 200, translating controller 205, language conversion controller 910, and summary index controller 920. Again, process control server 130 and messaging network 135 collectively include a messaging controller 210. Exemplary language conversion controller 910 converts received voice messages spoken in caller 105's language into text messages in subscriber 120's language. The text messages may then be shortened into message summaries, as described above. Exemplary summary index controller 920 analyzes the message summaries and generates therefrom an index of message summaries that may be transmitted to message pager 125 of subscriber 120.

In some embodiments of the present invention, language conversion controller 910 may be an integral part of translating controller 205. In alternate embodiments, such as the one illustrated in FIG. 9, language conversion controller 910 may be a separate processing device.

Returning to FIG. 4, consider data repository 200 which includes a plurality of data patterns 405 that include word fragments and phonemes in one or more foreign languages as well as the language spoken by subscriber 120. A foreign language is defined as any language spoken by caller 105 which is different than the local language of the messaging network.

According to this embodiment, a particular subscriber record 415 is associated with subscriber 120 and, among its other attributes, is in the language specified by subscriber 120 and includes pointers to particular ones of the plurality of data patterns 405 related to the language of caller 105. As in the case of same-language communications, these particular data patterns 405 are a "sub-set" of data patterns that represent foreign oral phrases that equate to oral phrases common to subscriber 120 and in the specified language of subscriber 120.

For this embodiment, translating controller 205, via messaging controller 210, prompts caller 105 for, and receives an oral message in the foreign language representing the body of a message for subscriber 120 (input/out step 340 of FIG. 3 with the addition of the foreign language). The translating controller processes the oral message as previously described for FIG. 5, but in this case the message is in a foreign language.

Translating controller 205 stores the received foreign language text message in data repository 200 and then separates the stored text message into sub-parts, at least some of which have one or more measurable characteristics (e.g. phonemes in the foreign language.) Translating controller 205 compares such measurable foreign language characteristics and the stored data patterns 405 in data record 415, and generates at least a substantially equivalent foreign language text message in response there to. The generated foreign language text message is a concatenation of data patterns that represent those sub-parts, or groups of sub-parts, separately, or collectively, that compare most favorably.

Translating controller 205 then compares the generated foreign language text message with existing foreign language text message in data records 415 of FIG. 4. When a match is found, the pointer associated with the foreign language message points to the equivalent message in the designated language of subscriber 120.

As previously described, messaging controller 210 transmits, via messaging network 135, at least part of the resulting subscriber language text message to subscriber 120 having message pager 125. As an option to the presence of foreign language data patterns 405, translating controller 205 may prompt caller 105 to designate the language of the originating message. This embodiment, for instance, could require caller 105 to specify the originating language of caller 105 by using the phone DTMF keypad for entry of coded number which correlates with the selected foreign language. The caller's verbal message is then translated to foreign text messages by translating controller 205, as described above. Subsequently, translating controller 205 stores the foreign language text message in data repository 200. After the foreign language code and message are stored, translating controller 205 notifies language conversion controller 910 that a foreign language message and code are present and ready for the conversion process.

Using the received foreign language code, language conversion controller 910 then correlates each portion of the stored foreign language text message with word fragments, phonemes, and words in a section of its database associated with the received foreign language code. Once the most likely foreign language text message has been assembled, language conversion controller 910 uses the received foreign language code and the stored subscriber 120 code to convert the foreign language text message into an equivalent text message in the language specified for subscriber 120.

Language conversion controller 910 may convert received voice messages into subscriber 120's language using a number of different methods. Each of these methods is described in greater detail in the following paragraphs. For these discussions, assume that caller 105 only speaks and understands the foreign language (e.g. Spanish) and that subscriber 120 only speaks and understands English. The English version of the message to be transferred is "CALL JUAN AT MARIA'S OFFICE 2145559999".

Caller 105, using the foreign language, identifies the message as being for subscriber 120 followed by the message text. In this case, messaging controller 210 receives the complete oral message from caller 105. This message is subsequently played back to caller 105, as received. If caller 105 rejects the message, the process starts over again with a new message. When caller 105 approves the stored oral message, the message is converted to a foreign text message using the previously described methodology.

Figure 10:
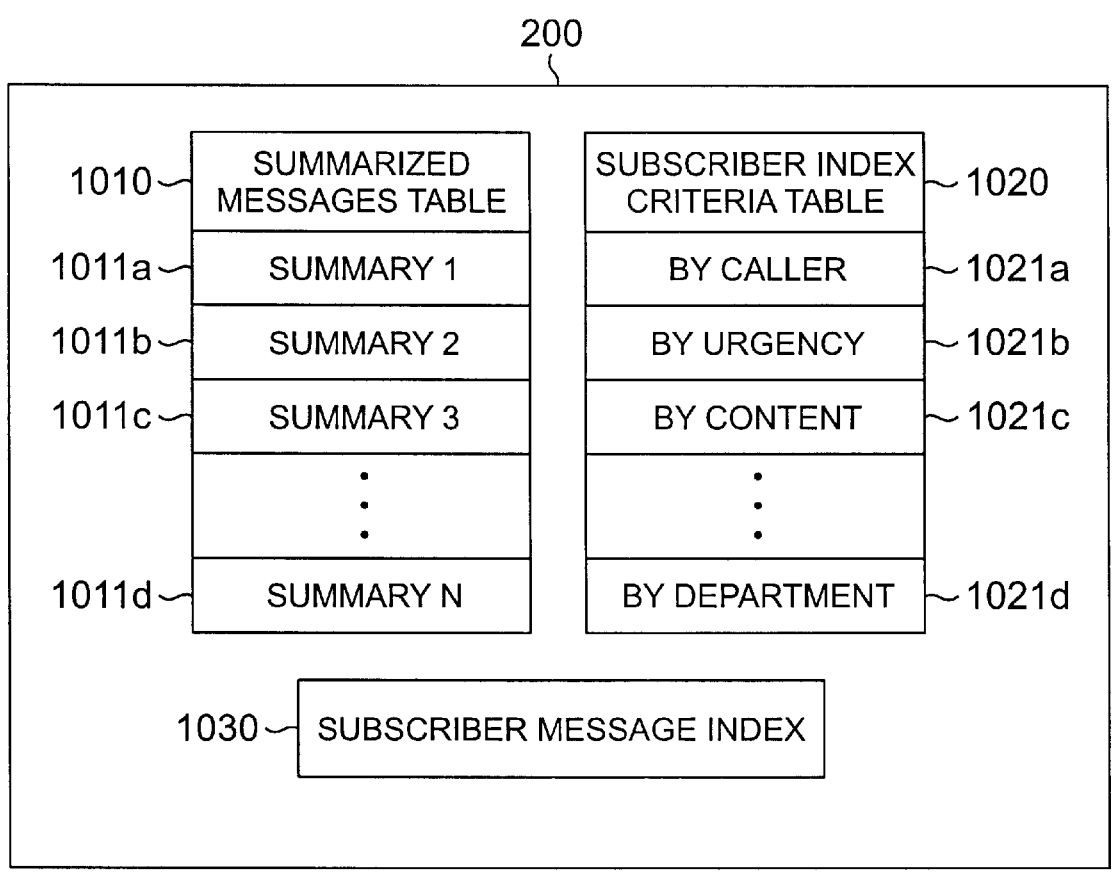
FIG. 10 illustrates data tables in data repository that are used by an exemplary summary index controller in accordance with the principles of the present invention.
Figure 11:
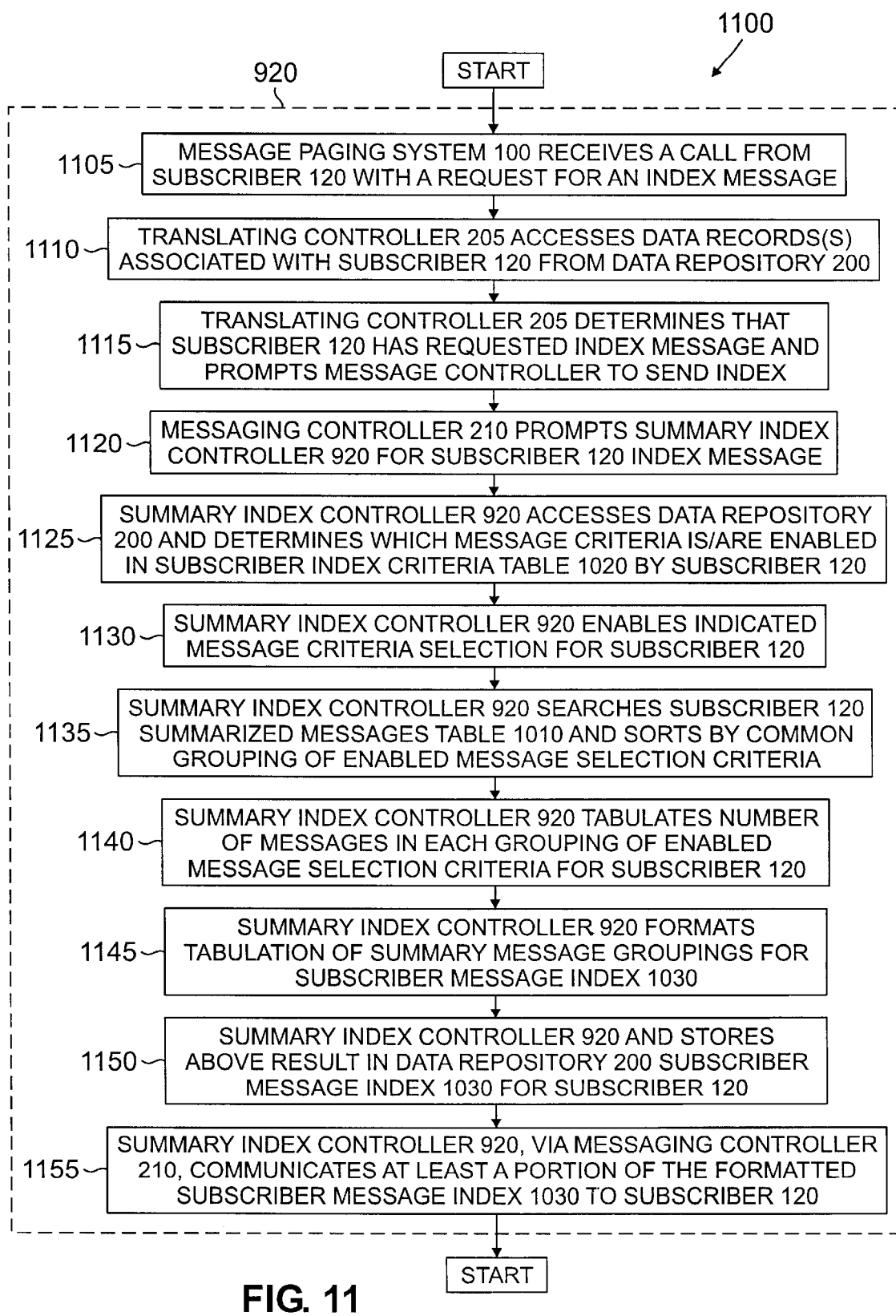
FIG. 11 illustrates a flow diagram of an exemplary method for operating the exemplary summary index controller of FIG. 9.

Summary index controller 920 further condenses the messages summarized by translating controller 205 by generating an index of messages that are ready for delivery to subscriber 205. The operation of summary index controller 920 may best be explained by jointly referring to FIGS. 9, 10 and 11. FIG. 10 illustrates data tables in data repository 200 that are used by summary index controller 920 in accordance with the principles of the present invention. FIG. 11 illustrates a flow diagram 1100 of an exemplary method for operating the exemplary summary index controller 920 of FIG. 9.

FIG. 10 illustrates summarized messages table 1010, subscriber index criteria table 1020, and subscriber message index 1030,which comprise the portion of the data repository 200 associated with the summary index controller 920 of FIG. 9. Summarized message table 1010 contains summarized messages 1011*a*–1011*d*, which are arbitrarily labeled as Summary 1 through Summary N. Each entry in summarized messages table 1010 provides a summary of the corresponding subscriber message stored in previously described subscriber record 415 in data records 410. The message summary provides information from the particular message which relates to keywords in the indicated subscriber index. For example, each of summary messages 1011*a*–1011*d* may contain data that identifies the caller, the level of message urgency, the message content, the destination or department, etc.

The subscriber index criteria table 1020 contains subscriber criteria 1021*a*–1021*d*. The subscriber criteria in table 1020 identify a group of message criteria that the subscriber selects for organizing the summarized messages. These criteria are utilized by the subscriber when requesting selective delivery of received messages. Subscriber message index 1030 represents the resulting message index that is created by summary index controller 920. Subscriber message index 1030 provides a listing or index of the message summaries that satisfy a particular category of the subscriber index criteria table 1020. For instance, subscriber message index 1030 may contain a listing of message summaries sorted by caller, by urgency level, by message content, by the department from which the message was generated.

For example, assume that the subscriber selects the "By Caller" criteria. Messages are sorted by an incoming telephone number or a voice name left by each caller. Summary index controller 920 scans the summarized messages table 1010 for an indication of each caller and the number of messages received from that caller. Depending upon the implementation and criteria specified by the subscriber, the caller identity may relate to the phone number that initiated the message, a correlation of the initiating phone number to name of known person, the voice name left by the caller, etc.

When the subscriber requests a listing of the message caller index, the resulting subscriber message index 1030 sent to a message pager may look like this:

Wife—1

Secretary—3

John Smith—2

214-922-9221—5

For another example, assume the "By Urgency" criteria is selected. Summary index controller 920 then sorts the message summaries by an urgency indicator left by each caller using the phone keypad. The resulting subscriber message index 1030 sent to the message pager may look like this:

Urgent—1

Not Urgent—6

As a further example, assume the "By Content" criteria is selected by the subscriber. Summary message controller 920 then sorts the message summaries by keywords picked out of the text of the messages. The resulting subscriber message index 1030 sent to the message pager may look like this:

Call me—2

Meetings—2

Urgent—1

Lunch—1

As a final example, assume that the "By Department" criteria is selected and that this represents the caller's company name or department. The summary index controller 920 initially sorts the summarized messages table 1010 according to the incoming telephone number or voice name left by the caller. The summary index controller 920 may then organize by the caller's company affiliation, by department within subscriber's company, etc. Summary index controller 920 may derive the originating company or department name based on a correlation of known numbers to known company or department names. The resulting subscriber message index 1030 sent to message pager may look like this:

Marketing—3

Technical—1

J.C. Penney—1

FIG. 11 illustrates a flow diagram 1100 of an exemplary method (generally designated 1100) for operating the exemplary summary index controller 920 of FIG. 9. To begin, message paging system 100, (particularly, messaging controller 210) receives a call from subscriber 120 indicating a request for a message index (process step 1105). Translating controller 205 accesses one or more data records in data repository 200 that are associated with subscriber 120, including subscriber index criteria table 1020 (process step 1110). As previously described, the data record(s) provide particulars for delivering messages to subscriber 120.

Automatically, through index criteria table 1020 or as specified by the message received from subscriber. 120, translating controller 205 determines that subscriber 120 has requested a message index and prompts message controller 210 to transfer subscriber message index 1030 to subscriber 120 (process step 1115). Message controller 210 then prompts summary index controller 920 to send subscriber message index 1030 to subscriber 120 (process step 1120).

Summary index controller 920 accesses data repository 200 and determines which message criteria is/are enabled in subscriber index criteria table 1020 by subscriber 120 (process step 1125). One or more such indexes may be enabled in the table. For instance, subscriber 120 may indicate that it is only interested in knowing the number of messages for each selected urgency level. Alternatively, subscriber 120 may request the number of messages for each urgency level from each identified caller.

Based upon the analysis, summary index controller 920 enables the indicated message criteria selected by subscriber 120 (process step 1130). Summary index controller 920 then searches summarized messages table 1010 for subscriber 120 messages which are then sorted in groups corresponding to various categories of the selected index criteria (process step 1135). Next, summary index controller 920 tabulates the number of messages in each grouping of sorted messages (process step 1140). Summary index controller 920 then formats the tabulation of summary message groupings into the required format for subscriber message index 1030 (process step 1145). Summary index controller 920 stores this formatted information in data repository 200 subscriber message index 1030 for subscriber 120 (process step 1150). Finally, summary index controller 920,via messaging controller 210, communicates at least a portion of the formatted subscriber message index 1030 to subscriber 120 (process step 1155).

Some message recipients, such as subscriber 120, may receive dozens or even hundreds of messages per day. It would in some cases be useful for a message recipient to receive a summary report listing their unread messages (with message numbers) by selected criteria. The message recipient would then be in a better position to select messages that need to be handled immediately and those that-can be handled later.

For example, a regional sales manager on a business flight might call the paging system SIVR interface and request that a summary report of the sales manager's unread voice messages be sent to the sales manager's e-mail address. The sales manager then could connect to the e-mail account from a notebook computer via the in-flight telephone in order to receive the e-mail message summarizing the sales manager's voice messages. This would allow the sales manager to check for messages that he or she may have missed during the flight. Alternatively, the sales manager could request that the summary report be sent as a facsimile (fax) document to a fax machine at a hotel or office to which the sale manager is going.

The following is a brief example of a possible format for such reports:

Date: Monday, Jan 3, 2000

Time: 9:00 am

URGENT—1

22—CALL OFFICE URGENT

CALL—3

18—CALL JANE AT (214) 555-9999

22—CALL OFFICE URGENT

23—CONFERENCE CALL AT 1:00 PM

MEETING—2

19—CUSTOMER CHANGED MEETING TO TUESDAY AFTERNOON

21—REGIONAL SALES MEETING SET FOR NEXT THURSDAY

LUNCH—1

17—ARE YOU AVAILABLE LUNCH ON FRIDAY

MISC/OTHER—2

20—JUST CALLED TO SAY HI

24—NEED TO ASK QUESTION ABOUT INVOICE

Note that more than one of the organizing criteria words can occur in the same message. For example, message #22 contains the words "URGENT" and "CALL" and is listed in both categories.

Although the principles of the present invention have been described in detail with reference to message paging system and infrastructure embodiments, those of ordinary skill in the art should understand that they can make various changes, substitutions and alterations herein without departing from the spirit and scope of the invention in its broadest form.

What is claimed is:

1. A non-realtime messaging system comprising:
    a messaging controller operable to receive from callers oral messages directed to a first subscriber of said non-realtime messaging system and operable to transmit text messages to a communications device associated with said first subscriber;
    a translating controller, associated with said messaging controller, operable to generate translated text messages, wherein each of said translated text messages corresponds to one of said received oral messages;
    a data repository operable to store said translated text messages; and
    a summary index controller, associated with said messaging controller and said data repository, operable to generate from said translated text messages a subscriber message index, wherein said subscriber message index comprises a reduced summary of one or more of said translated text messages.

2. The non-realtime messaging system set forth in claim 1 wherein said summary index controller generates said subscriber message index according to criteria selected by said first subscriber.

3. The non-realtime messaging system set forth in claim 1 wherein said subscriber message index comprises a listing indicating a number of translated text messages received from particular callers.

4. The non-realtime messaging system set forth in claim 1 wherein said subscriber message index comprises a listing indicating a level of urgency associated with selected ones of said translated text messages.

5. The non-realtime messaging system set forth in claim 1 wherein said subscriber message index comprises a listing indicating the content of selected ones of said translated text messages.

6. The non-realtime messaging system set forth in claim 1 wherein said subscriber message index comprises a listing indicating a number of translated text messages received from at least one organizational group associated with one or more callers.

7. The non-realtime messaging system set forth in claim 1 wherein said messaging controller is operable to receive from said subscriber a selection message indicating particular ones of said translated text messages that said first subscriber wishes to receive.

8. The non-realtime messaging system set forth in claim 7 wherein said messaging controller, in response to receipt of said selection message transmits to said first subscriber selected ones of said translated text messages.

9. A method of operating a non-realtime messaging system the method comprising the steps of:
    receiving from callers oral messages directed to a first subscriber of the non-realtime messaging system;
    generating translated text messages, wherein each of the translated text messages corresponds to one of the received oral messages;
    storing the translated text messages; and
    generating from the translated text messages a subscriber message index, wherein the subscriber message index comprises a reduced summary of one or more of the translated text messages.

10. The method of operating the non-realtime messaging system set forth in claim 9 wherein the subscriber message index is generated according to criteria selected by the first subscriber.

11. The method of operating the non-realtime messaging system set forth in claim 9 wherein the subscriber message index comprises a listing indicating a number of translated text messages received from particular callers.

12. The method of operating the non-realtime messaging system set forth in claim 9 wherein the subscriber message index comprises a listing indicating a level of urgency associated with selected ones of the translated text messages.

13. The method of operating the non-realtime messaging system set forth in claim 9 wherein the subscriber message index comprises a listing indicating the content of selected ones of the translated text messages.

14. The method of operating the non-realtime messaging system set forth in claim 9 wherein the subscriber message index comprises a listing indicating a number of translated text messages received from at least one organizational group associated with one or more callers.

15. The method of operating the non-realtime messaging system set forth in claim 9 including the further step of transmitting the subscriber message index to a communications device associated with the first subscriber.

16. The method of operating the non-realtime messaging system set forth in claim 9 including the further step of receiving from the subscriber a selection message indicating particular ones of the translated text messages that the first subscriber wishes to receive.

17. The method of operating the non-realtime messaging system set forth in claim 16 including the further step of transmitting to the first subscriber selected ones of the translated text messages in response to receipt of the selection message.

18. For use in a messaging system that includes a data repository operable to store text messages translated from oral messages received in said messaging system, said oral messages and said translated text messages directed to a first subscriber, a summary index controller operable to generate from said translated text messages a subscriber message index, wherein said subscriber message index comprises a reduced summary of one or more of said translated text messages.

19. The non-realtime messaging system set forth in claim 18 wherein said summary index controller generates said subscriber message index according to criteria selected by said first subscriber.

20. The non-realtime messaging system set forth in claim 18 wherein said subscriber message index comprises a listing indicating a number of said translated text messages received from particular callers.

21. The non-realtime messaging system set forth in claim 18 wherein said subscriber message index comprises a listing indicating a level of urgency associated with selected ones of said translated text messages.

22. The non-realtime messaging system set forth in claim 18 wherein said subscriber message index comprises a listing indicating the content of selected ones of said translated text messages.

23. The non-realtime messaging system set forth in claim 18 wherein said subscriber message index comprises a listing indicating a number of said translated text messages received from at least one organizational group associated with one or more callers.

* * * * *